(12) United States Patent
Agrawal et al.

(10) Patent No.: US 11,347,545 B2
(45) Date of Patent: May 31, 2022

(54) ADAPTIVE STATE MANAGEMENT FOR STATELESS SERVICES

(71) Applicant: International Business Machines Corporation, Armonk, NY (US)

(72) Inventors: Sugandha Agrawal, Stuttgart (DE); Timo Kussmaul, Boeblingen (DE); Harald Daur, Esslingen (DE); Torsten Teich, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 16/823,516

(22) Filed: Mar. 19, 2020

(65) Prior Publication Data

US 2021/0294645 A1   Sep. 23, 2021

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/5072* (2013.01); *G06F 16/907* (2019.01)

(58) Field of Classification Search
CPC ..... G06F 9/4881; G06F 16/907; G06F 9/5072
See application file for complete search history.

(56) References Cited

U.S. PATENT DOCUMENTS 7,730,123 B1   6/2010   Erickson
8,560,563 B2   10/2013  Chieu
(Continued)

FOREIGN PATENT DOCUMENTS

CA   2981271 A1   10/2016
WO   2012022585 A1   2/2012

OTHER PUBLICATIONS

De Moraes et al., "A Scoring Method Based on Criteria Matching for Cloud Computing Provider Ranking and Selection," S. Hammoudi et al. (Eds. ), Enterprise Information Systems (ICEIS) 2017, Lecture Notes in Business Information Processing, vol. 321, pp. 339-365. First online Jun. 16, 2018 <https://link.springer.com/chapter/10.1007/978-3-319-93375-7_16>.

(Continued)

*Primary Examiner* — Wissam Rashid
(74) *Attorney, Agent, or Firm* — Richard B. Thomas

(57) ABSTRACT

A computer-implemented method for controlling state updates in a cloud service environment may be provided. The method includes maintaining a set of state provider definitions, wherein each state provider definition comprising a set of required input variable definitions, a set of output variable definitions and related metadata. The method also includes determining a set of input variable definitions required by an invoked service, receiving the determined set of input variable definitions by the state provider management service, selecting a state provider definition, wherein the selected state provider definition is to be compatible with the received set of input variable definitions, determining a set of matching state provider services matching the selected state provider definition, scoring the determined set of state provider services, invoking the highest scoring state provider service, and passing the state data to the invoked service.

20 Claims, 7 Drawing Sheets

(51) Int. Cl.
    *G06F 16/907*     (2019.01)
    *G06F 9/50*       (2006.01)

(56) References Cited

U.S. PATENT DOCUMENTS

| | | |
|---|---|---|
| 9,749,387 B2 | 8/2017 | Chadzelek |
| 9,934,214 B2* | 4/2018 | Maddali ................. G06F 40/18 |
| 9,967,351 B2 | 5/2018 | Maheshwari |
| 10,275,235 B2* | 4/2019 | Buehler ................. H04L 67/02 |
| 2004/0230681 A1 | 11/2004 | Strassner |
| 2015/0309970 A1 | 10/2015 | Wuellner |
| 2018/0077038 A1* | 3/2018 | Left ................... H04L 43/0823 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

International Search Report and Written Opinion dated May 17, 2021 for International Application No. PCT/IB2021/051112, filed Feb. 11, 2021.

* cited by examiner

ADAPTIVE STATE MANAGEMENT FOR STATELESS SERVICES

BACKGROUND

The present disclosure relates generally to state management, and more specifically, to a computer-implemented method for controlling state updates in a cloud service and/or computing environment. The present disclosure relates further to a storage control system for controlling state updates in a cloud service environment, and a computer program product.

Modern computing environments, often deployed on cloud computing platforms and in cloud frameworks, are composed of a plurality of interacting services and/or micro-services. One of the characteristics of such micro-services is that they are often stateless, i.e., the state is not persistent from one invocation to a next one. Specifically, the state, including the data, of one session of a micro-service is not saved for the next session, or call, with that microservice. However, in some instances, it may be useful to make the state of the micro-services available for a next call of the associated micro-services. This is not only interesting as an underlying technology for transactional applications—e.g., technical e-commerce infrastructure—but also for the management of cloud computing frameworks and/or multi-processor systems in cloud computing environments. Such resources may be available from different provider organizations under different conditions, performance levels and service level agreements. However, if a resource management for such resources may also be based on an interaction of stateless services are/or micro-services, it may also be useful in such situations to access the "old" state of the respective service/micro-service.

Cloud providers typically provide the physical or virtual computing resources to which clients can subscribe and use resources of the service computing environment, whereas the cloud provider manages the allocation and the underlying computing and network infrastructure. This operation model is advantageous for the client, as the client can optimize operational costs. On the other hand, the cloud provider's legitimate interest is to minimize operational and investment costs for the business model to be feasible. Therefore, the cloud provider typically limits the computer resource allocation, where the limitation is normally supported by a specific programming methodology. The underlying programming model is thus a stateless, event driven, processing time limited serverless model.

While being advantageous for specific execution requirements, this model has also some disadvantages. Obviously, one disadvantage is that it is stateless, i.e., data or state information cannot easily be shared from one execution cycle to the next execution cycle of a function or between different functions or services.

There are several disclosures related to a computer-implemented method for controlling state updates in a cloud service environment.

Document U.S. Pat. No. 9,749,387 B2 discloses embodiments for providing transparently a stateful execution for stateless applications based on a received request associated with an application including at least one operation to be executed by the application, as well as a first state information.

Document CA 2981271 A1 discloses a method and an apparatus for facilitating a stateless representation of interaction flow states associated with customer interactions including effecting a generation of a first uniform resource locator (URL) indicative of a textual input received from a customer during an online transaction.

A disadvantage of known solutions may be that they often focus on commercial transactional systems and less on a deep technical functionality for controlling and optimizing multi-processor-based cloud computing environments in which competing stateless services have to be used, but where maintaining its status is nevertheless necessary. The solution to this problem can be seen as the underlying objective of the proposed concept.

SUMMARY

According to one aspect of the present disclosure, a computer-implemented method for controlling state updates in a cloud service environment is provided. The method comprises maintaining a set of state provider definitions in a state provider registry by a state provider management service. Each state provider definition comprises a set of required input variable definitions and a set of output variable definitions and related metadata.

The method also comprises, upon invoking a service, determining a set of input variable definitions required by the invoked service. The method further comprises receiving the determined set of input variable definitions by the state provider management service. The method also comprises selecting, by the state provider management service, a state provider definition by referring to the state provider registry, where the selected state provider definition is to be compatible with the received set of input variable definitions.

Furthermore, the method comprises determining a set of state provider services matching the selected state provider definition. The method also comprises scoring the determined set of state provider services using the metadata relating to the state provider definition of the determined set of state provider services. The method further comprises invoking the highest scoring state provider service, thereby generating state data, and passing the state data to the invoked service.

According to another aspect of the present disclosure, a state control system for controlling state updates in a cloud service environment is provided. The state control system comprises a state provider registry module adapted for maintaining a set of state provider definitions by a state provider management service unit, where each state provider definition comprises a set of required input variable definitions, a set of output variable definitions, and related metadata. The system also comprises a first determination means adapted for, upon invoking a service, determining a set of input variable definitions required by the invoked service, where the state provider management service unit is also adapted for receiving the determined set of input variable definitions.

Additionally, the state provider management service unit is adapted for selecting a state provider definition by referring to the state provider registry, where the selected state provider definition is to be compatible with the received set of input variable definitions.

Moreover, the state control system comprises a second determining means adapted for determining a set of state provider services matching the selected state provider definition. The system also comprises scoring means adapted for scoring the determined set of state provider services using the metadata relating to the state provider definition of the determined set of state provider services. The system also comprises invocation means adapted for invoking the highest scoring state provider service, thereby generating state data. The system further comprises sending means adapted for passing the state data to the invoked service.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device. Therefore, a computer program product for controlling state updates in a cloud service environment is provided. The computer program product includes a computer readable storage medium having program instructions embodied therewith, the program instructions being executable by one or more computing systems or controllers to cause the one or more computing systems to maintain a set of state provider definitions in a state provider registry by a state provider management service, each state provider definition including a set of required input variable definitions, a set of output variable definitions, and related metadata.

The program instructions also cause the one or more computing systems to, upon invoking a service, determine a set of input variable definitions required by the invoked service. The instructions further cause the one or more computing systems to receive the determined set of input variable definitions by the state provider management service. The program instructions also cause the one or more computing systems to select, by the state provider management service, a state provider definition by referring to the state provider registry, where the selected state provider definition is to be compatible with the received set of input variable definitions.

The program instructions further cause the one or more computing systems to determine a set of state provider services matching the selected state provider definition. The program instructions also cause the one or more computing systems to score the determined set of state provider services using the metadata relating to the state provider definition of the determined set of state provider services. The program instructions further cause the one or more computing systems to invoke the highest scoring state provider service, thereby generating state data. The program instructions also cause the one or more computing systems to pass the state data to the invoked service.

The proposed computer-implemented method for controlling state updates in a cloud service environment—as well as the related system—may offer multiple advantages, technical effects, contributions, and/or improvements:

The here-proposed concept may be enabled to intercept a call to invocate to a stateless service and/or micro-service in a cloud computing environment and infuse the state of the same service and/or micro-service from a time when the service/micro-service has been terminated after a previous execution. This mechanism may not only work for one service and/or micro-service but also for a plurality of identical services and/or micro-services provided by the same or different providers in the underlying cloud computing environment. Using a state provider registry, a plurality of state provider services may be identified fulfilling state definitions, satisfying the calling service or micro-service. Based on metadata related to the state provider registry, a specific state provider service may be selected according to a service level agreement or other predefined conditions and/or rules required by the calling service or micro-service, or by the state provider management service.

This may not only allow managing statuses of otherwise stateless services/micro-services, but also selecting an appropriate state provider service according to predefined rules. This may allow a high flexibility in state management of services/micro-services in cloud computing environments but may also enable a load-balancing between resources of different entities (i.e., providers) offering state provider services having the same characteristics.

The proposed concept may unfold its advantages also in hardware-near management tasks of resources. Thus, statuses of processors, co-processors, memory units, memory systems, and/or network resources may be elegantly monitored and managed with originally stateless services which may now be equipped and may use state information according to the proposed disclosed concept.

In the following, additional embodiments of the disclosed concept—applicable to the method, as well as to the related system and computer program product—will be described.

According to an advantageous embodiment, the method may also comprise storing, by the state provider management service in the metadata repository, for each state provider service, an invocation counter which may be incremented by the state provider management service upon each invocation of the state provider service. Hence, it may be determined which of the state provider services is used the most. This indicator may be used for quality assessments, performance assessments, and availability and reliability assessments for a future selection of a state provider service for a given set of required input data.

When responding to a state provider service request matching a given state provider definition, the state provider registry—in which the invocation counter may be stored—may further return the invocation counter as part of the response data for the state provider service. When the state provider management service receives the invocation counter, it may compare it with the last stored invocation counters for selected state provider services. Furthermore, the state provider management service may drop the actual service request if the received invocation counter for selected state provider function is greater or equal to the last stored invocation counter.

According to a useful embodiment, the method may also comprise, upon finalizing an execution of the service, returning output values of the service to the state provider service from which the state data have been received. This activity may also be executed under the control of the state provider management service. Thus, the state provider management service may play a central role in the here proposed concept.

According to an additionally advantageous embodiment, the method may also comprise storing persistently the received state data by the state provider service from which the state data have been received. Thus, the state provider service may have fulfilled its purpose to keep track of a state of a related service which may have been called by an application to fulfill a predefined functionality.

According to an extended embodiment, the method, upon determining that the invoked first state provider service requires a second state, may also comprise the following steps: invoking a second state provider service via the state provider management service; determining a related set of input variables for the second state provider service; determining of a set of matching second state provider services; scoring the set of matching second state provider services; selecting the highest scoring second state provider service, thereby generating second state data; passing the second state data to the second state provider service; and returning output values of an execution of the second state provider service as the second state.

This way, it becomes possible to manage a sequence of dependent states for a given service. In this case, the service provider services may be activated by the service provider management service in a recursive way such that, starting from a first selected service provider service, using a service provider definition, one or more additional state provider services may be selected and activated in a cascade to finally return the desired state to the calling service.

According to another advantageous embodiment of the method, the scoring the determined set of state provider services may result in a set of highest scoring state provider services having the same score value, and invoking the set—in particular the complete set—of highest scoring state provider services in parallel. This way, not only one service provider service may be activated at a given time, but equivalently behaving state provider services—i.e., enabled to return the same status—may be executed in parallel. This way, a performance test may be enabled for the different state provider services ensuring that in future instances of a state provider service activation the one state provider service may be selected providing the highest performance. Alternatively, state provider services from different providers in a cloud computing environment, which may execute the state provider services under different service level agreements, may be measured against each other.

This behavior may be expressed in the next optional embodiment according to which the method may also comprise measuring performance values for an executing the set of highest scoring state provider services, and storing the respective performance value in the metadata of the respective state provider service. Thus, the results of the performance comparison may be stored persistently in the metadata also controlled and accessible by the state provider management service.

According to a further useful embodiment of the method, the determining the set of state provider services may also comprise determining the matching state provider service according to the predefined rules on the metadata. In doing so, the state provider service may be selected according to the predefined rules, like those given by predefined quality standards, service level agreements, performance indicators, and/or other behavior indicators of the service provider service.

According to a further extended embodiment of the method, the determining the set of state provider services may also comprise determining the matching state provider service according to a current workload profile in the cloud computing environment. This way, also different workloads in different sections or portions of a cloud computing environment, i.e., a given time computing center may be reflected and/or also controlled.

According to one permissive embodiment of the method, the highest scoring state provider service may be determined according to a round-robin principle. Thus, each time the state provider service according to a predefined state provider service definition has to be invoked, another one, confirming to the same definition, may get a chance to be executed.

It may also be mentioned that the definition of highest scoring may be understood broadly, i.e., the scoring may underlie its own set which may dynamically be changed according to predefined conditions in the cloud computing environment. For example, the highest scoring state provider may actually be the one having shown—and particularly during past executions—that its performance is the highest, i.e., that the specific state provider service returns the state in the shortest amount of time. In another case, a state provider service may be selected—according to another rule—having the best track record of being compliant with a selected set of SLAs and/or quality requirements, and so forth.

BRIEF DESCRIPTION OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the disclosure is not limited.

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
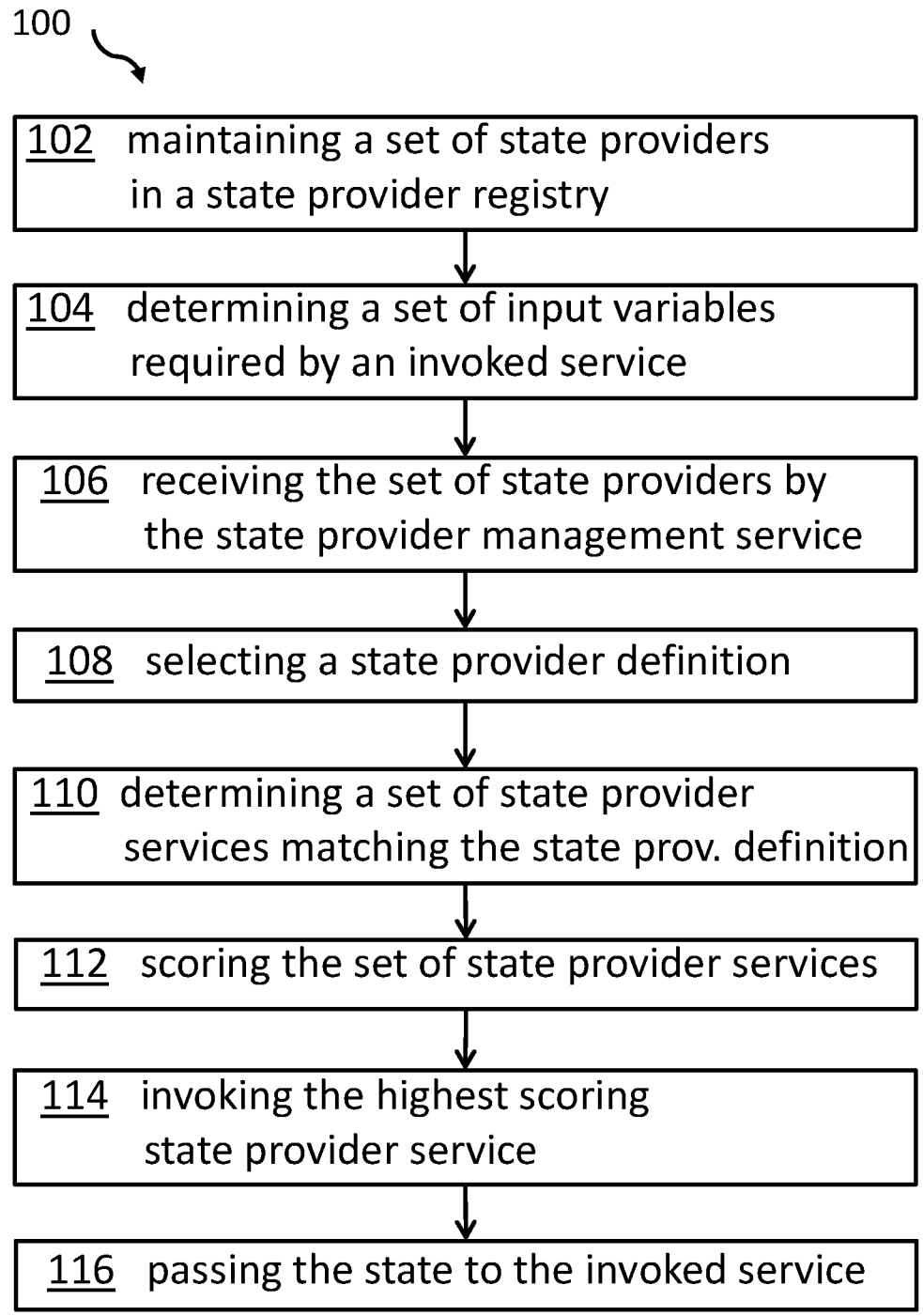

FIG. 1 shows a block diagram of an embodiment of the computer-implemented method for controlling state updates in a cloud service environment.

Figure 2:
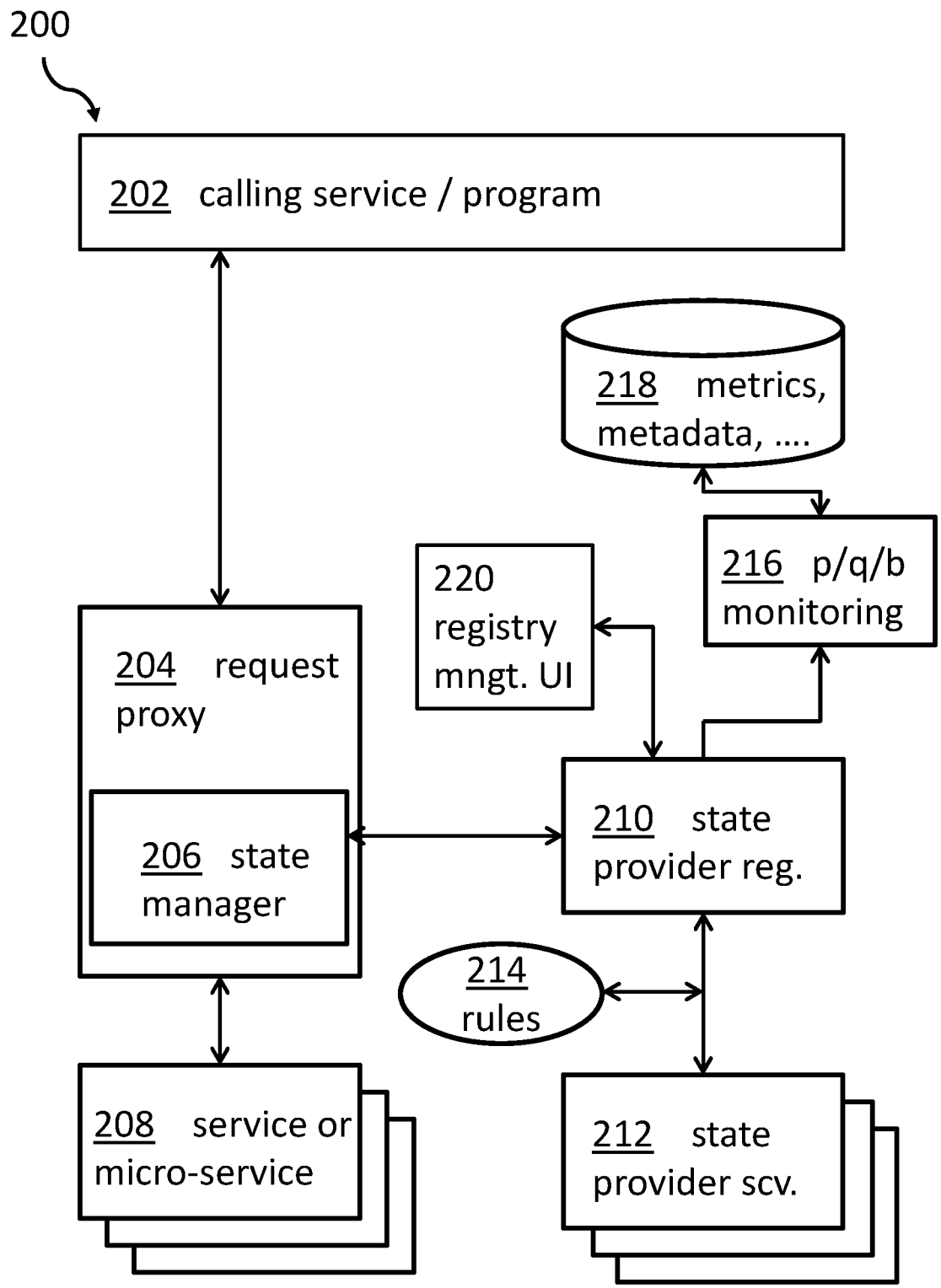

FIG. 2 shows a block diagram of an embodiment of relevant units and selected communication path supporting the here-proposed concept.

Figure 3:
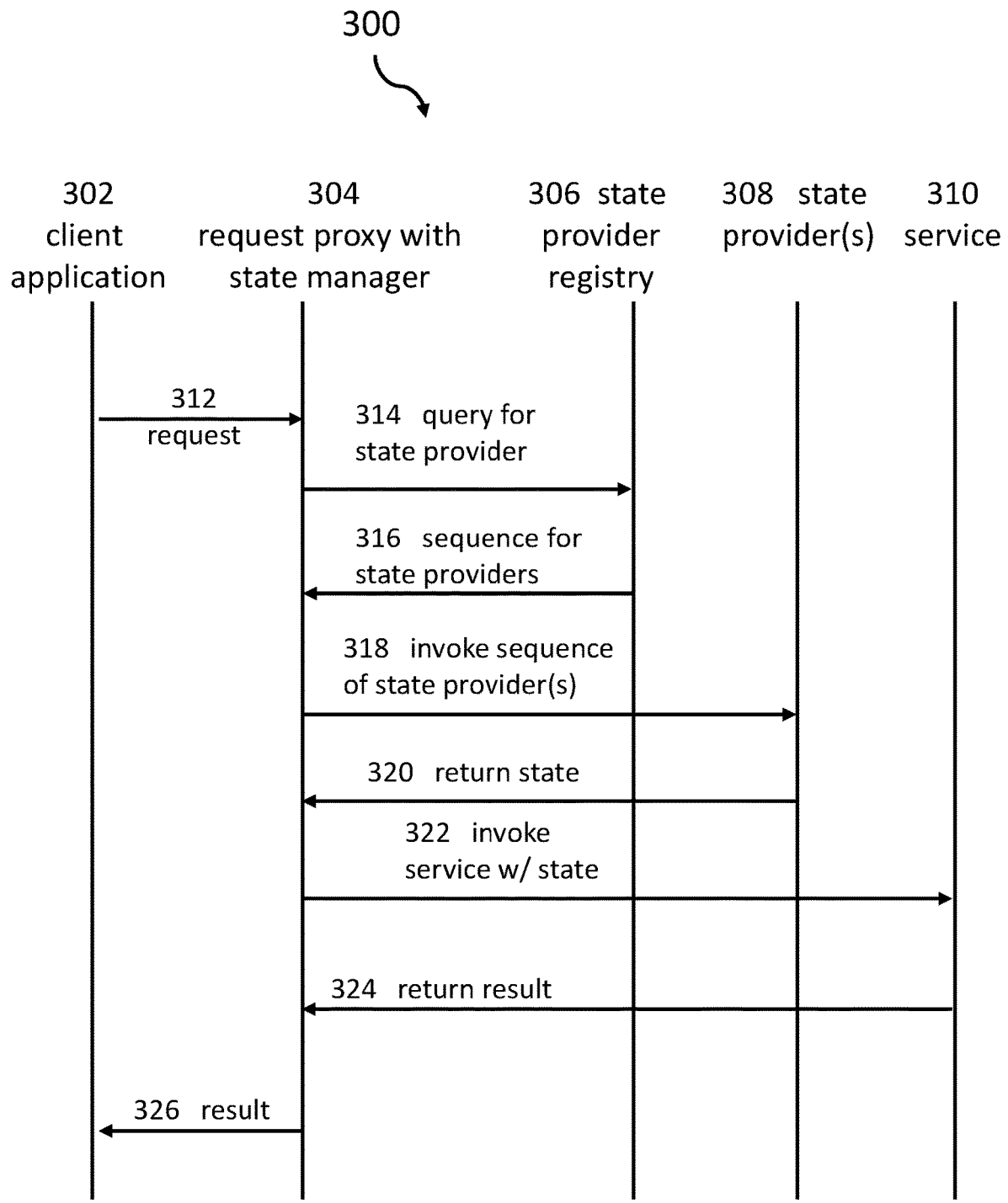

FIG. 3 shows a diagram of an embodiment of message flows between core components of the here-proposed concept.

Figure 4:
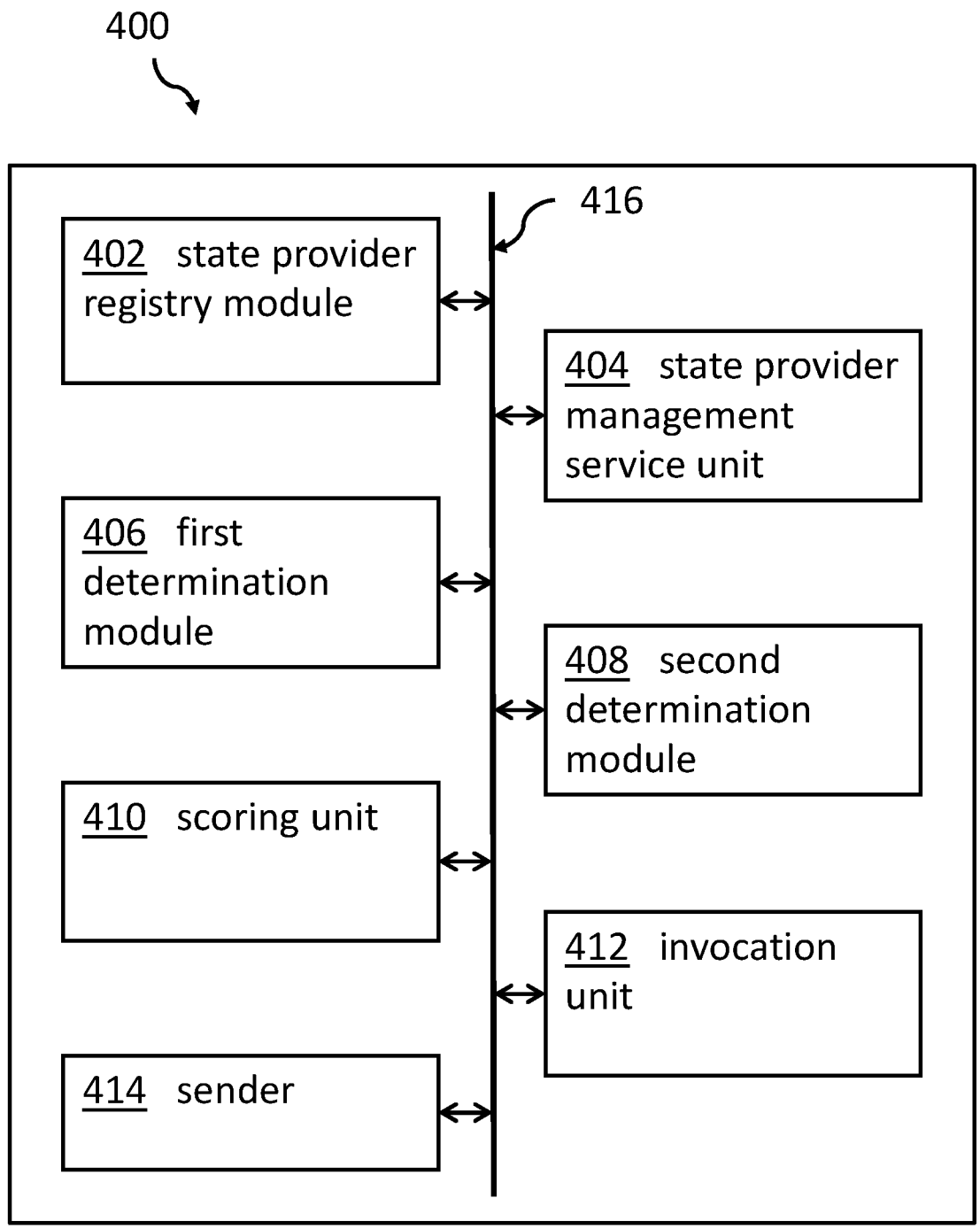

FIG. 4 shows a block diagram of an embodiment of the state control system for controlling state updates in a cloud service environment.

Figure 5:
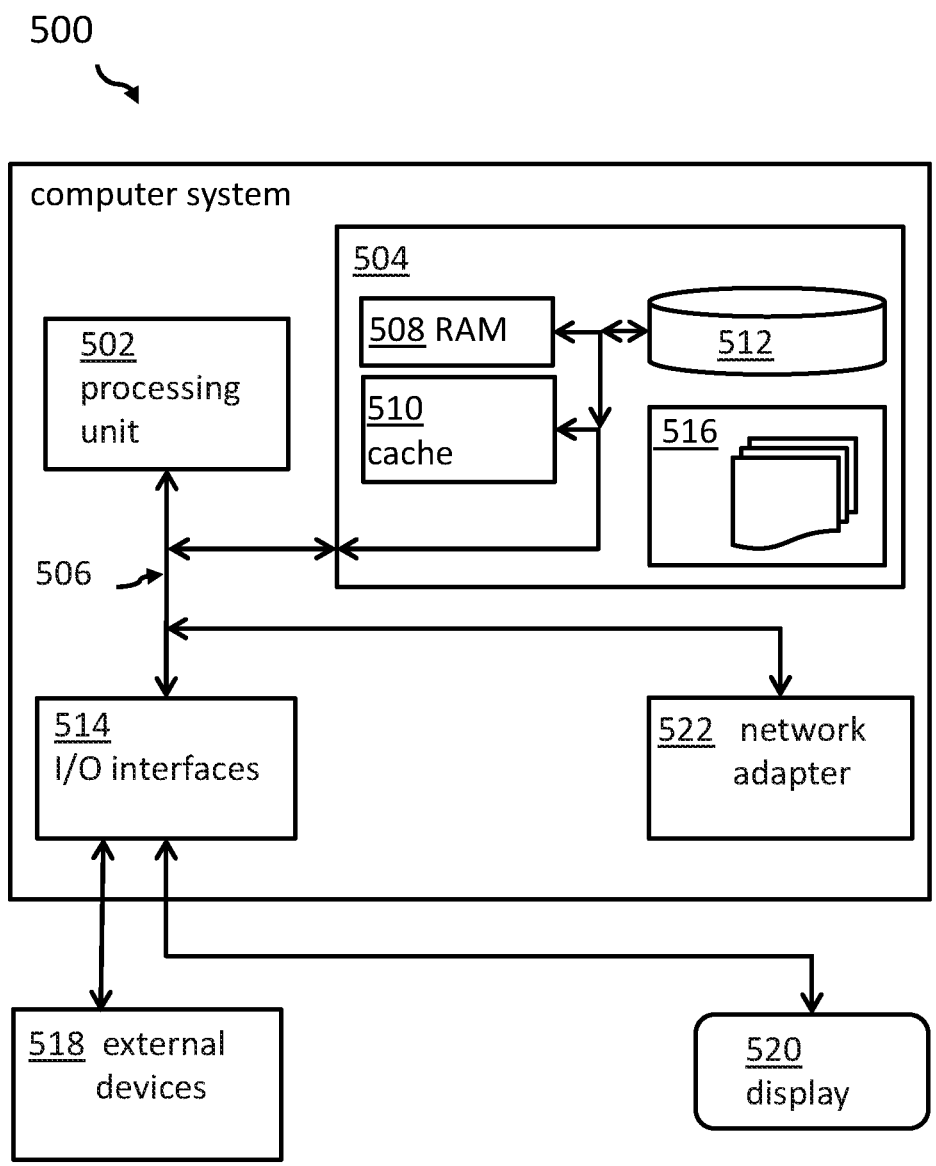

FIG. 5 shows an embodiment of a computing system comprising the state control system according to FIG. 4.

Figure 6:
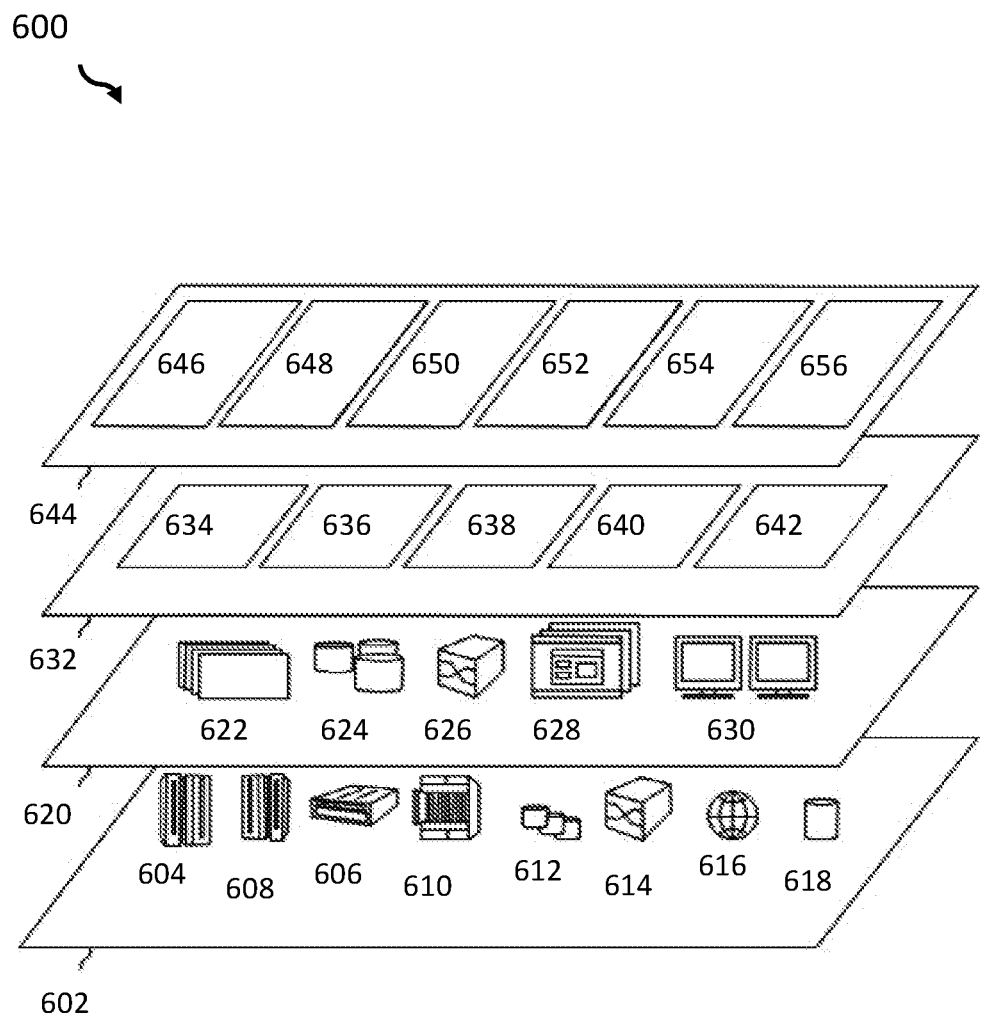

FIG. 6 shows a cloud computing environment in which at least parts of the disclosed concept may be deployed.

Figure 7:
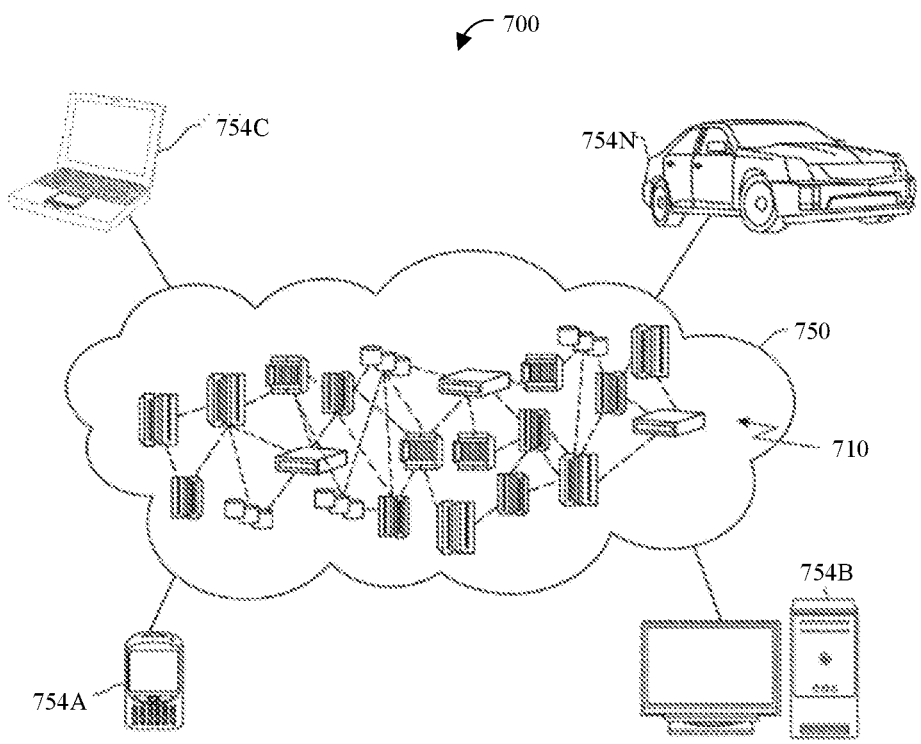

FIG. 7 is a schematic diagram illustrating a cloud computer environment, in accordance with some embodiments of the present disclosure.

DETAILED DESCRIPTION

In the context of this description, the following conventions, terms and/or expressions may be used:

The term 'state'—in particular of a service of a microservice—may be defined as the last-known or current status of the service or application or process in a computing system. A state in terms of a service may further be elaborated as the current value of variables or parameters of the service and the state may change as and when applications are executed.

The term "stateful" may denote an application or service which may maintain its state typically at any time. In contrast, a stateless application or service may be completely self-contained and the data and execution transaction boundaries are congruent with the start- and endpoints of the application or service. Therefore, if a stateless service is started again, it may not have any memory about its previous life, i.e., has no data about the previous execution and any of the variables used.

The term "service" may denote here a mechanism to enable access to one or more abilities and/or resources, were the access may be provided using a prescribed interface and which may be exercised consistently with constraints and/or policies a specified by a related service description. Sometimes, a software technique is used to develop micro-services in a very end of the service-oriented architecture (SOA) structural style. In this case, an application may be arranged as a collection of loosely coupled services. In a micro-services architecture, services are more fine-grained and protocols are more lightweight if compared to the more classical SOA computing environment. In the context of this document, the terms "service" and "micro-service" may be used interchangeably.

The term "state provider management service" may denote a new function in the context of enabling state management for so far stateless services. Thus, also a stateless service may, in its function, be announced to become stateful without changing the stateless service at all. The state of the stateless service may be managed independently of other services outside of the stateless service by a state provider service. A collection of state provider services may be managed by the related state provider management service. It may be equipped with a user interface (UI) 220 or API (Application Programming Interface) in order to define, change or delete state provider definitions. Typically, a state provider definition comprises at least required input variables and output variables of the related service. In at least some embodiments, more than one state provider service may exist for one state provider definition. Hence, more than one state provider services may be invoked and may be executed in parallel.

The term "state provider registry" may be managed and manipulated—i.e., new entries may be defined, changed or deleted—by the state provider management service. Therefore, the state provider registry may provide APIs for registering, querying, due registering and updating state provider services.

The term "state provider service" may here be defined by a state provider specification or state provider definition which is stored in the state provider registry and managed by the state provider management service. Thereby, the state provider definition may determine the specifics of the state provider service, e.g., required input variables—which may match the related requirements of the service depending on the state provider service—and output variables for ensuring a persistent storage of the state of the service.

As an example, z( ): id, * may define the state provider service z, which does not depend on further states or state provider services, and which may provide the states variable "id" for all services and state provider services (thus the wildcard "*").

As another example, y(id): name, address, x may define the state provider service y (which now depends on the state "id", to be provided by another state provider), which provides the state variables "name" and "address" for services and state provider's services which adhere to the service specification "x", where x may be a regular expression on the service name.

The term 'metadata' may denote—in particular metadata of a state provider service —specific characteristics of the state provider service in question. The metadata may be directed to performance indicators, quality parameters, special service level agreements, the provider, operating the state provider service, and/or other behavior characteristics the state provider service has.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, the term 'cloud computing'- and equivalently the term 'cloud service environment'—may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of at least five characteristics, at least three service models, and at least four deployment models.

Essential characteristics of cloud computing comprise:
(i) On-demand self-service: a consumer can unilaterally provision computing capabilities, such as server time and network storage, as needed automatically without requiring human interaction with each service provider.
(ii) Broad network access: capabilities are available over the network and accessed through standard mechanisms that promote use by heterogeneous thin or thick client platforms (e.g., mobile phones, laptops, and PDAs).
(iii) Resource pooling: the provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter).
(iv) Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.
(v) Measured Service: cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing comprise:
(i) Cloud Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(ii) Cloud Platform as a Service (PaaS): the capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

(iii) Cloud Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:

(i) Private cloud. The cloud infrastructure is operated solely by an organization. It may be managed by the organization or a third party and may exist on premise or off premise.

(ii) Community cloud. The cloud infrastructure is shared by several organizations and supports a specific community that has shared concerns (e.g., mission, security requirements, policy, and compliance considerations). It may be managed by the organizations or a third party and may exist on-premise or off-premise.

(iii) Public cloud. The cloud infrastructure is made available to the general public or a large industry group and is owned by an organization selling cloud services.

(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness (with exceptions), low coupling, modularity, and semantic interoperability.

In the following, a detailed description of the figures will be given. All instructions in the figures are schematic. Firstly, a block diagram of an embodiment of the disclosed computer-implemented method for controlling state updates in a cloud service environment is given. Afterwards, further embodiments, as well as embodiments of the storage control system for controlling state updates in a cloud service environment, will be described.

FIG. 1 shows a block diagram of an embodiment of the computer-implemented method 100 for controlling state updates in a cloud service environment. The method 100 comprises maintaining, 102, a set of state provider definitions in a state provider registry by a state provider management service which may also be denoted as the state manager. Each state provider definition comprises at least a set of required input variable definitions (in a special case the set can only comprise one input variable definition), a set of output variable definitions (also here a group of one is possible) and related metadata. The set of output variables may be seen as the state of the service at its execution end point.

The method 100 also comprises: upon invoking a service, determining, 104, a set of input variable definitions required by the invoked service. The information about the required input variables may be delivered by or derived from the service itself or requested from a related service or micro-service registry.

Additionally, the method 100 comprises receiving, 106, the determined set of input variable definitions by the state provider management service, selecting, 108, by the state provider management service, a state provider definition by referring to the state provider registry, where the selected state provider definition is to be compatible with the received set of input variable definitions (also here, it can be only one definition), and determining, 110, a set of state provider services (again, only 1 is possible) matching the selected state provider definition.

Next, the method 100 comprises scoring, 112, the determined set of state provider services using the metadata relating to the state provider definition of the determined set of state provider services, invoking, 114, the highest scoring state provider service—in particular according to a predetermined rule—thereby generating state data, and passing, 116, the state data to the invoked service. This way, a stateless by design service or micro-service may get a state that is infused, thereby preserving the benefits of stateless execution, and also getting the benefits of stateful behavior.

FIG. 2 shows a block diagram 200 of an embodiment of relevant units and selected communication path supporting the here proposed concept.

Firstly, the calling service, micro-service or program 202 should be mentioned which is the origin for requesting an execution of the service 208. Services and/or micro-services may be managed and controlled by a service registry and related control mechanisms (both not shown here). However, the request into the service 208 may be intercepted and/or controlled by the request proxy 204 which comprises the state manager 206 or, in other words, the state provider management service 206.

The state provider management service 206 has access to the state provider definitions in the state provider registry 210. Measurement data for performance, quality and behavior, etc., of the state provider services may be continuously or sporadically be monitored by the performance monitor 216 which may also control the storage of other performance logs 218. Additionally, the state provider management service 206 can be equipped with a registry UI (User Interface) 220 in order to enable a manual driven definition of the entries in the service provider registry, or with an API to enable a systems management tool (not shown) to maintain the entries in the service provider registry 210.

The state provider management service 206 may, according to the definition from the state provider registry 210, invoke a specific and matching state provider service 212. Furthermore, predefined rules 214, derivable from the metadata, also stored in the state provider registry 210, may influence a selection of one or more state provider services 212 relating to a state provider definition.

FIG. 3 shows a diagram 300 of an embodiment of message flows between core components of the here proposed concept. The flow of the messages is reflecting functions of the embodiment discussed in the context of FIG. 2. The process flow starts with a request 312 from the client application 302 (compare 202, FIG. 2). That request 312 arrives at the request proxy with the state manager or state provider management service 304. This queries, 314, the state provider registry 306 for an appropriate state provider service. The state provider registry 306 responds, 316, with a sequence of one or more state providers. Next, the state provider management service 304 invokes, 318, the one or the sequence of state provider services 308. The one or more state provider services 308 returns, 320, the persistently stored state. Based on this—i.e., with the state data— the requested service 310 (in particular requested from the client application 302) is invoked, 322, by the request proxy with the now available state. After the execution of the service 310, the result is returned, 324, to the request proxy 304 from which the result is returned, 326, to the originally calling client application 302 (or service).

For completeness reasons, FIG. 4 shows a block diagram of an embodiment of the state control system 400 for controlling state updates in a cloud service environment. The state control system 400 comprises a state provider registry module 402 adapted for maintaining a set of state provider definitions by a state provider management service unit 404. Thereby, each state provider definition comprises a set of required input variable definitions, a set of output variable definitions and related metadata.

The state control system 400 comprises also first determination means—in particular a first determination module 406—adapted for, upon invoking a service, determining a set of required input variable definitions required by the invoked service, where the state provider management service unit 404 is also adapted for receiving the determined set of input variable definitions. Thereby, the state provider management service unit 404 is also adapted for selecting a state provider definition by referring to the state provider registry, where the selected state provider definition is to be compatible with the received set of input variable definitions.

The state control system 400 comprises additionally second determining means—in particular a second determination module 408—adapted for determining a set of state provider services matching the selected state provider definition, scoring means—in particular a scoring unit 410— adapted for scoring the determined set of state provider services using the metadata relating to the state provider definition of the determined set of state provider services, invocation means—in particular an invocation unit 412— adapted for invoking the highest scoring state provider service, thereby generating state data, and, last but not least, sending means—in particular a sender 414—adapted for passing the state data to the invoked service.

It should be noted that all mentioned means, units, modules and the like may each be implemented as a hardware controller, in particular the state provider registry module 402, the state provider management service unit 404, the first determination module 406, the second determination module 408, the scoring unit 410, the invocation unit 412, and the sender 414. These hardware-implemented functional units can be linked to each other via electrical connections 416 (individual wires or a bus system) in order to exchange the messages, as discussed in the context of FIG. 3.

Before turning to FIG. 5, in FIG. 6 a cloud computing environment is shown in which at least parts of the disclosed concept may be deployed.

FIG. 6 shows a cloud computing environment 600 in which at least parts of the disclosed concept may be deployed. A set of functional abstraction layers provided by a cloud computing environment is shown. It should be understood in advance that the components, layers, and functions shown in FIG. 6 are intended to be illustrative only and embodiments of the disclosure are not limited thereto. As depicted, the following layers and corresponding functions are provided: Hardware and software layer 602 include hardware and software components. Examples of hardware components include: mainframes 604; servers 606; RISC (Reduced Instruction Set Computer) architecture based servers 608; blade servers 610; storage devices 612; networks 614 and networking components 614. In some embodiments, software components include network application server software 616 and/or database software 618.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630. In one example, management layer 632 may provide the functions described below. Resource provisioning 634 provides dynamic procurement of computing resources and other resources that are utilized to perform tasks within the cloud computing environment. Metering and pricing 636 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provides pre-arrangement for, and procurement of, cloud computing resources for which a future requirement is anticipated in accordance with an SLA.

Workload layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and the state control module 656 (compare FIG. 4, 400).

Embodiments of the disclosure may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network pcs, minicomputer systems, mainframe computer systems, and distributed cloud computing environments that include any of the above systems or devices, and their equivalents.

Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include industry standard architecture (ISA) bus, micro channel architecture (MCA) bus, enhanced ISA (EISA) bus, video electronics standards association (VESA) local bus, and peripheral component interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the disclosure.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the disclosure, as described herein. For example, the program modules 516 can be executed by the one or more processors 502 to implement one or more of the state provider registry module 402, the state provider management service unit 404, the first determination module 406, the second determination module 408, the scoring unit 410, the invocation unit 412, and the sender 414.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) That enable computer system/server 500 to communicate with one or more other computing devices. Such communication can occur via input/output (I/O) interfaces 514. Still yet, computer system/server 500 may communicate with one or more networks such as a local area network (LAN), a general wide area network (wan), and/or a public network (e.g., the internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, raid systems, tape drives, and data archival storage systems, etc.

Referring now to FIG. 7, a schematic diagram is provided illustrating an example cloud computing network 700. As shown, cloud computing network 700 includes a cloud computing environment 750 having one or more cloud computing nodes 710 with which local computing devices used by cloud consumers may communicate. Examples of these local computing devices include, but are not limited to, personal digital assistant (PDA) or cellular telephone 754A, desktop computer 754B, laptop computer 754C, and/or automobile computer system 754N. Individual nodes within nodes 710 may further communicate with one another. They may be grouped (not shown) physically or virtually, in one or more networks, such as Private, Community, Public, or Hybrid clouds as described hereinabove, or a combination thereof. This allows the cloud computing network 700 to offer infrastructure, platforms and/or software as services for which a cloud consumer does not need to maintain resources on a local computing device. It is understood that the types of computing devices 754A-N shown in FIG. 7 are intended to be illustrative only and that the cloud computing environment 750 can communicate with any type of computerized device over any type of network and/or network addressable connection (e.g., using a web browser).

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-ray-disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an internet service provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

EXAMPLE EMBODIMENTS

Example 1 includes a computer-implemented method for controlling state updates in a cloud service environment. The method comprises maintaining a set of state provider definitions in a state provider registry by a state provider management service, each state provider definition comprising a set of required input variable definitions, a set of output variable definitions and related metadata. The method further comprises, upon invoking a service determining a set of input variable definitions required by the invoked service, receiving the determined set of input variable definitions by the state provider management service; selecting, by the state provider management service, a state provider definition by referring to the state provider registry, wherein the selected state provider definition is to be compatible with the received set of input variable definitions; determining a set of state provider services matching the selected state provider definition; scoring the determined set of state provider services using the metadata relating to the state provider definition of the determined set of state provider services; invoking the highest scoring state provider service, thereby generating state data; and passing the state data to the invoked service.

Example 2 includes the method according to example 1, also comprising storing, by the state provider management service in a metadata repository, for each state provider service an invocation counter which is incremented by the state provider management service upon each invocation of the state provider service.

Example 3 includes the method according to any of examples 1 or 2, also comprising upon finalizing an execution of the service, returning output values of the service to the state provider service from which the state data have been received.

Example 4 includes the method according to example 3, also comprising storing persistently the received state data by the state provider service from which the state data have been received.

Example 5 includes the method according to any of examples 1-4, wherein the invoked state provider service becomes a first state provider service, the method also comprising upon determining that the invoked first state provider service requires a second state; invoking a second state provider service, via the state provider management service; determining a related set of input variables for the second state provider service; determining of a set of matching second state provider services; scoring the set of matching second state provider services; selecting the highest scoring second state provider service, thereby generating second state data; passing the second state data to the second state provider service; and returning output values of an execution of the second state provider service as the second state.

Example 6 includes the method according to any of examples 1-5, wherein the scoring the determined set of state provider services results in a set of highest scoring state provider services resulting in the same score value, the method further comprising invoking the set of highest scoring state provider services in parallel.

Example 7 includes the method according to example 6, also comprising measuring performance values for an executing the set of highest scoring state provider services, and storing a respective performance value in the metadata of a respective state provider service.

Example 8 includes the method according to any of examples 1-7, wherein the determining the set of state provider services also comprises determining the matching state provider service according to predefined rules on the metadata.

Example 9 includes the method according to any of examples 1-8, wherein the determining the set of state provider services also comprises determining the matching state provider service according to a current workload profile in the cloud computing environment.

Example 10 includes the method according to any of examples 1-9, wherein a highest scoring state provider service is determined according to a round-robin principle.

Example 11 includes a state control system for controlling state updates in a cloud service environment. The state control system comprises a state provider registry module adapted for maintaining a set of state provider definitions by a state provider management service unit, wherein each state provider definition comprises a set of required input variable definitions, a set of output variable definitions and related metadata. The state control system also comprises first determination means adapted for, upon invoking a service, determining a set of input variable definitions required by the invoked service. The state provider management service unit is also adapted for receiving the determined set of input variable definitions. The state provider management service unit is also adapted for selecting a state provider definition by referring to the state provider registry. The selected state provider definition is to be compatible with the received set of input variable definition. The state control system also comprises second determining means adapted for determining a set of state provider services matching the selected state provider definition; scoring means adapted for scoring the determined set of state provider services using the metadata relating to the state provider definition of the determined set of state provider services; invocation means adapted for invoking the highest scoring state provider service, thereby generating state data; and sending means adapted for passing the state data to the invoked service.

Example 12 includes the state control system according to example 11, wherein the state provider management service unit is also adapted for storing, in a metadata repository, for each state provider service an invocation counter which is incremented by the state provider management service upon each invocation of the state provider service.

Example 13 includes the state control system according to any of example 11 or 12, also comprising returning means adapted for returning, upon finalizing an execution of the service, output values of the service to the state provider service from which the state data have been received.

Example 14 includes the state control system according to example 13, also comprising storage means adapted for storing persistently the received state data by the state provider service from which the state data have been received.

Example 15 includes the state control system according to any of examples 11 to 14, wherein the invoked state provider service becomes a first state provider service, and wherein the state control system is also adapted for, upon determining that the invoked first state provider service requires a second state, invoking a second state provider service, via the state provider management service unit. The state control system is also adapted for determining a related set of input variables for the second state provider service; determining of a set of matching second state provider services; scoring the set of matching second state provider services; selecting the highest scoring second state provider service, thereby generating second state data; passing the second state data to the second state provider service; and returning output values of an execution of the second state provider service as the second state.

Example 16 includes the state control system according to any of examples 11 to 15, wherein the scoring means are also adapted for scoring the determined set of state provider services results in a set of highest scoring state provider services resulting in the same score value. The state control system is further configured to invoke the set of highest scoring state provider services in parallel.

Example 17 includes the state control system according to example 16, also comprising measurement means adapted for measuring performance values for an executing the set of highest scoring state provider services, and adapted for storing a respective performance value in the metadata of a respective state provider service.

Example 18 includes the state control system according to any of examples 11 to 17, wherein the second determination means adapted for determining a set of state provider services are also adapted for determining the matching state provider services according to predefined rules in the metadata.

Example 19 includes the state control system according to any of the examples 11 to 18, wherein the second determination means are also adapted for determining the matching the state provider services according a current workload profile in the cloud computing environment.

Example 20 includes a computer program product for controlling state updates in a cloud service environment, the computer program product comprising a computer readable storage medium having program instructions embodied therewith, said program instructions being executable by one or more computing systems or controllers to cause said one or more computing systems to maintain a set of state provider definitions in a state provider registry by a state provider management service, each state provider definition comprising a set of required input variable definitions, a set of output variable definitions and related metadata; upon invoking a service, determine a set of input variable definitions required by the invoked service; receive the determined set of input variable definitions by the state provider management service; and select, by the state provider management service, a state provider definition by referring to the state provider registry. The selected state provider definition is to be compatible with the received set of input variable definition. The program instructions are further executable by the one or more computing systems or controllers to determine a set of state provider services matching the selected state provider definition; score the determined set of state provider services using the metadata relating to the state provider definition of the determined set of state provider services; invoke the highest scoring state provider service, thereby generating state data; and pass the state data to the invoked service.

What is claimed is:

1. A computer-implemented method for controlling state updates in a cloud service environment, the method comprising:
   maintaining a set of state provider definitions in a state provider registry by a state provider management service, each state provider definition comprising a set of required input variable definitions, a set of output variable definitions and related metadata;
   upon invoking a service determining a set of input variable definitions required by the invoked service;
   receiving the determined set of input variable definitions by the state provider management service;
   selecting, by the state provider management service, a state provider definition by referring to the state provider registry, wherein the selected state provider definition is to be compatible with the received set of input variable definitions;
   determining a set of state provider services matching the selected state provider definition;
   scoring the determined set of state provider services using the metadata relating to the state provider definition of the determined set of state provider services;
   invoking the highest scoring state provider service, thereby generating state data; and
   passing the state data to the invoked service.

2. The method according to claim 1, further comprising:
   storing, by the state provider management service in a metadata repository, for each state provider service an invocation counter which is incremented by the state provider management service upon each invocation of the state provider service.

3. The method according to claim 1, further comprising:
   upon finalizing an execution of the service, returning output values of the service to the state provider service from which the state data have been received.

4. The method according to claim 3, further comprising:
   storing persistently the received state data by the state provider service from which the state data have been received.

5. The method according to claim 1, wherein the invoked state provider service becomes a first state provider service, the method further comprising:
   upon determining that the invoked first state provider service requires a second state:
      invoking a second state provider service, via the state provider management service;
      determining a related set of input variables for the second state provider service;
      determining of a set of matching second state provider services;
      scoring the set of matching second state provider services;

selecting the highest scoring second state provider service, thereby generating second state data;
passing the second state data to the second state provider service; and
returning output values of an execution of the second state provider service as the second state.

6. The method according to claim 1, wherein the scoring the determined set of state provider services results in a set of highest scoring state provider services resulting in the same score value, the method further comprising:
invoking the set of highest scoring state provider services in parallel.

7. The method according to claim 6, further comprising:
measuring performance values for an executing the set of highest scoring state provider services; and
storing a respective performance value in the metadata of a respective state provider service.

8. The method according to claim 1, wherein the determining the set of state provider services further comprises:
determining the matching state provider service according to predefined rules on the metadata.

9. The method according to claim 1, wherein the determining the set of state provider services further comprises:
determining the matching state provider service according to a current workload profile in the cloud computing environment.

10. The method according to claim 1, wherein a highest scoring state provider service is determined according to a round-robin principle.

11. A state control system for controlling state updates in a cloud service environment, the state control system comprising:
a state provider registry module adapted for maintaining a set of state provider definitions by a state provider management service unit, wherein each state provider definition comprises a set of required input variable definitions, a set of output variable definitions and related metadata;
first determination means adapted for, upon invoking a service, determining a set of input variable definitions required by the invoked service;
wherein the state provider management service unit is also adapted for receiving the determined set of input variable definitions;
wherein the state provider management service unit is also adapted for selecting a state provider definition by referring to the state provider registry, wherein the selected state provider definition is to be compatible with the received set of input variable definition;
second determining means adapted for determining a set of state provider services matching the selected state provider definition;
scoring means adapted for scoring the determined set of state provider services using the metadata relating to the state provider definition of the determined set of state provider services;
invocation means adapted for invoking the highest scoring state provider service, thereby generating state data; and
sending means adapted for passing the state data to the invoked service.

12. The state control system according to claim 11, wherein the state provider management service unit is also adapted for storing, in a metadata repository, for each state provider service an invocation counter which is incremented by the state provider management service upon each invocation of the state provider service.

13. The state control system according to claim 11, further comprising:
returning means adapted for returning, upon finalizing an execution of the service, output values of the service to the state provider service from which the state data have been received.

14. The state control system according to claim 13, also comprising:
storage means adapted for storing persistently the received state data by the state provider service from which the state data have been received.

15. The state control system according to claim 11, wherein the invoked state provider service becomes a first state provider service, and wherein the state control system is also adapted for:
upon determining that the invoked first state provider service requires a second state:
invoking a second state provider service, via the state provider management service unit;
determining a related set of input variables for the second state provider service;
determining of a set of matching second state provider services;
scoring the set of matching second state provider services;
selecting the highest scoring second state provider service, thereby generating second state data;
passing the second state data to the second state provider service; and
returning output values of an execution of the second state provider service as the second state.

16. The state control system according to claim 11, wherein the scoring means are also adapted for scoring the determined set of state provider services results in a set of highest scoring state provider services resulting in the same score value, thereby:
invoking the set of highest scoring state provider services in parallel.

17. The state control system according to claim 16, further comprising:
measurement means adapted for measuring performance values for an executing the set of highest scoring state provider services, and adapted for storing a respective performance value in the metadata of a respective state provider service.

18. The state control system according to claim 11, wherein the second determination means adapted for determining a set of state provider services are also adapted for:
determining the matching state provider services according to predefined rules in the metadata.

19. The state control system according to claim 11, wherein the second determination means are also adapted for:
determining the matching the state provider services according to a current workload profile in the cloud computing environment.

20. A computer program product for controlling state updates in a cloud service environment, the computer program product comprising a computer readable storage medium having program instructions embodied therewith, said program instructions being executable by one or more computing systems to cause said one or more computing systems to:
maintain a set of state provider definitions in a state provider registry by a state provider management service, each state provider definition comprising a set of required input variable definitions, a set of output variable definitions and related metadata;

upon invoking a service, determine a set of input variable definitions required by the invoked service;

receiving the determined set of input variable definitions by the state provider management service;

select, by the state provider management service, a state provider definition by referring to the state provider registry, wherein the selected state provider definition is to be compatible with the received set of input variable definition;

determine a set of state provider services matching the selected state provider definition;

score the determined set of state provider services using the metadata relating to the state provider definition of the determined set of state provider services;

invoke the highest scoring state provider service, thereby generating state data; and pass the state data to the invoked service.

\* \* \* \* \*